(No Model.) 2 Sheets—Sheet 1.
D. P. FOSTER.
PIPE TONGS.
No. 286,600. Patented Oct. 16, 1883.
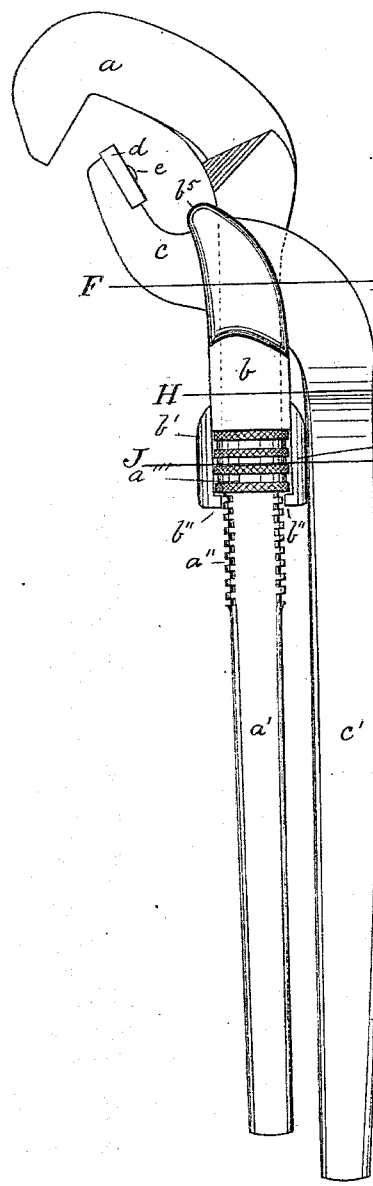
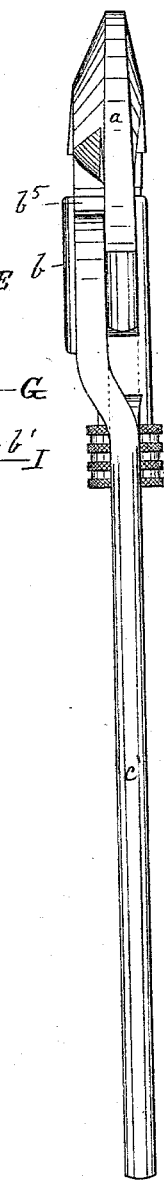
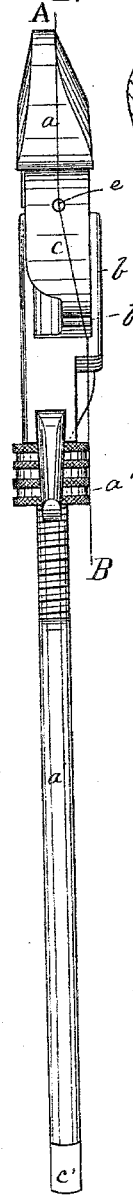
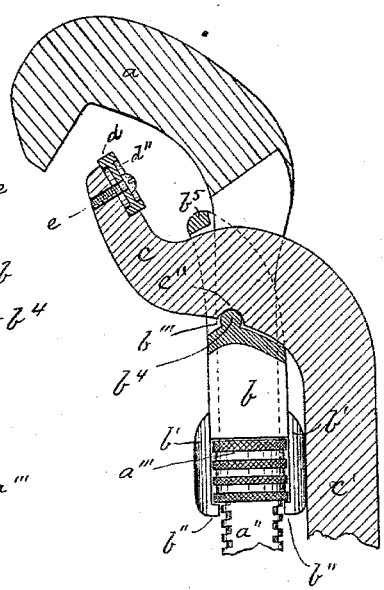
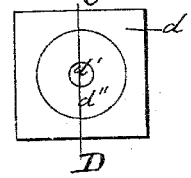
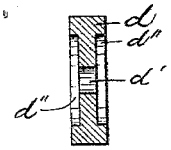
Witnesses.
Henry Chadbourn.
Sarah M. Goodrich
Inventor.
Dan P. Foster
by Alban Andrew
his atty.

(No Model.)

D. P. FOSTER.
PIPE TONGS.

No. 286,600. Patented Oct. 16, 1883.

Witnesses.
Henry Chadbourn.
C. A. Blackwell.

Inventor.
Dan P. Foster,
by his atty.

UNITED STATES PATENT OFFICE.

DAN P. FOSTER, OF WALTHAM, MASSACHUSETTS.

PIPE-TONGS.

SPECIFICATION forming part of Letters Patent No. 286,600, dated October 16, 1883.

Application filed December 16, 1882. (No model.)

*To all whom it may concern:*

Be it known that I, DAN P. FOSTER, a citizen of the United States, residing at Waltham, in the county of Middlesex and State of Massachusetts, have invented certain new and useful Improvements in Pipe-Tongs; and I do hereby declare that the same are fully described in the following specification and illustrated in the accompanying drawings.

This invention relates to improvements in pipe-tongs, and it is carried out as follows, reference being had to the accompanying drawings, in which—

Figure 7:
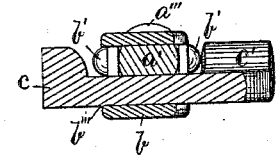
Figure 8:
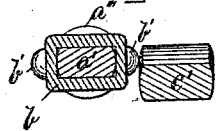
Figure 9:
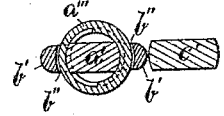
Figure 10:
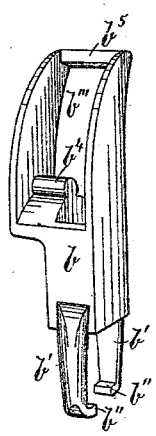

Figure 1 represents a side elevation. Fig. 2 represents a rear view, and Fig. 3 represents a front view, of the improved pipe-tongs. Fig. 4 represents a longitudinal section on the line A B, shown in Fig. 3. Fig. 5 represents a plan view of the detachable jaw-piece adapted to be secured to the under jaw, and Fig. 6 represents a longitudinal section of the said detachable jaw-piece on the line C D, shown in Fig. 5. Fig. 7 represents a cross-section on the line E F, shown in Fig. 1. Fig. 8 represents a cross-section on the line G H, shown in Fig. 1, and Fig. 9 represents a cross-section on the line I J, also shown in Fig. 1. Fig. 10 represents a perspective view of the frame or socket of the tongs.

Similar letters refer to similar parts wherever they occur on the different parts of the drawings.

$a$ is the hooked jaw of the tongs, which jaw extends downward as a shank or handle, $a'$, which is provided with a male screw-thread, $a''$, as shown in Figs. 1, 3, and 4.

$b$ is a metallic socket or frame, provided with a vertical perforation, in which the shank $a'$ is up-and-down adjustable by means of the serrated nut $a'''$, which latter is always held in its normal position relative the socket $b$ by means of the downward-projecting guides $b'\ b'$ and their inwardly-extending lips or projections $b''\ b''$, as shown in Figs. 1, 3, and 4. The socket or frame $b$ has also another function—namely, to serve as a hinge and fulcrum for the lower adjustable jaw, $c$, which passes through a lateral perforation, $b'''$, on one side of the hooked jaw $a$, as shown in the drawings, such lateral perforation having in its lower part a ridge or projection, $b^4$, which serves as a fulcrum on which the movable jaw $c$ is adapted to swing, for which purpose the under side of said jaw $c$ is provided with a corresponding notch or recess, $c''$, as shown in Fig. 4. The lateral perforation $b'''$ on the socket or frame $b$ is closed at top with the bar or ridge $b^5$, so as to retain the movable jaw $c$ on its fulcrum $b^4$, and to prevent its being detached from the hooked jaw $a$ when the tongs are in use.

$c'$ is the downward-projecting shank or handle of the vertically adjustable and swinging jaw $c$, as shown in Figs. 1, 2, and 4.

$d$ is the adjustable and detachable jaw-piece, secured at the upper end of the movable jaw $c$ by means of the screw $e$, passing through a perforation, $d'$, in the center of said jaw-piece $d$, as shown in Figs. 4, 5, and 6. Each of the two opposite faces of said jaw-piece $d$ has a central countersink, $d''\ d''$, as shown in said Figs. 4, 5, and 6, by which arrangement said jaw-piece $d$ may be ground on its two faces whenever its edges become dull or broken, and by grinding its two countersunk faces only a small amount of the face-surfaces has to be ground, and this is accomplished without in any manner lessening the size of the jaw-piece from edge to edge across over its face. The rear edge of the jaw-piece $d$ is made to rest firmly against a ledge or projection, $c''$, in the upper side of the movable jaw $c$, as shown in Figs. 1 and 4. It will thus be seen that the jaw-piece $d$ may be changed, so as to present eight successive working edges without being resharpened, and this is done simply by removing the holding-screw $e$ and turning said jaw-piece a quarter or half a revolution, or reversing its faces, and afterward securing it in place to the end of the movable jaw $c$ by means of the aforesaid screw $e$. As most of the wear and tear comes on the upper end of the lower movable jaw of pipe-tongs in general, it will readily be understood that such a detachable, adjustable, and changeable jaw-piece is very practical and useful and increases the efficacy and value of the tongs very materially.

It will be observed that both the stationary hooked jaw $a$ and the movable jaw $c$ are without any perforation whatever for a hinge or fulcrum-pin, and in this manner the strength of the said jaws is very much increased.

In using these my improved tongs, I adjust the relative positions of the movable and stationary jaws by means of the nut $a'''$, according to the size of the pipe or other object to be grasped. The shanks $a'$ $c'$ are then brought toward each other by the operator grasping them with one or both hands, causing the hooked jaw $a$ and movable jaw $c$, with its jaw-piece $d$, to take hold of the pipe or object very firmly.

What I wish to secure by Letters Patent and claim is—

The herein-described pipe-tongs, consisting of the stationary hook-jaw $a$, having shank $a'$, male screw $a''$, and nut $a'''$, the vertically-adjustable guide or frame $b$ $b'$ $b''$ $b'''$ $b^4$ $b^5$, and movable jaw $c$, having fulcrum-recess $c''$ and shank $c'$, as and for the purpose set forth.

In testimony whereof I have affixed my signature in presence of two witnesses.

DAN P. FOSTER.

Witnesses:
ALBAN ANDRÉN,
HENRY CHADBOURN.